US006983402B2

(12) United States Patent
Yoneda et al.

(10) Patent No.: US 6,983,402 B2
(45) Date of Patent: Jan. 3, 2006

(54) COMPUTER DEVICE

(75) Inventors: Takashi Yoneda, Osaka (JP); Masahiko Matsumoto, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 730 days.

(21) Appl. No.: 10/006,134

(22) Filed: Dec. 10, 2001

(65) Prior Publication Data

US 2002/0073286 A1 Jun. 13, 2002

(30) Foreign Application Priority Data

Dec. 11, 2000 (JP) ............................ 2000-375495

(51) Int. Cl.
*G06F 11/00* (2006.01)

(52) U.S. Cl. ........................................ 714/48; 714/719

(58) Field of Classification Search .................. 714/48, 714/47, 38–39, 15, 20, 719, 799, 819, 822; 712/37, 205

See application file for complete search history.

(56) References Cited

U.S. PATENT DOCUMENTS

| | | | | |
|---|---|---|---|---|
| 5,157,776 A | | 10/1992 | Foster | |
| 5,404,467 A | * | 4/1995 | Saba et al. | 712/207 |
| 5,701,506 A | * | 12/1997 | Hosotani | 712/37 |

FOREIGN PATENT DOCUMENTS

| | | |
|---|---|---|
| JP | 60-225254 | 4/1984 |
| JP | 09-305422 | 11/1997 |

* cited by examiner

*Primary Examiner*—Dieu-Minh Le
(74) *Attorney, Agent, or Firm*—McDermott Will & Emery LLP

(57) ABSTRACT

In a computer device, a latch circuit latches a program read from a ROM. Even when a program C is mistakenly read from the ROM in place of a correct program B, a CPU outputs an access signal to the ROM again to read the program B at the same address from the ROM, and a match detection circuit compares the program B with the program C output from the latch circuit. Since these programs fail to match with each other, the CPU outputs the access signal again. If the ROM outputs the program B correctly this time, the program B matches with the program B output from the latch circuit when the match detection circuit compares these programs. The CPU then executes the program B as correctly read ROM data. Thus, even when a program in the ROM is mistakenly read, safe operation by a correctly read program is ensured.

9 Claims, 8 Drawing Sheets

COMPUTER DEVICE

BACKGROUND OF THE INVENTION

The present invention relates to a computer device.

A conventional computer device and a control method thereof are described with reference to FIG. 11, which illustrates a configuration of a conventional computer device. A central processing unit (CPU) 100 is connected with a read-only only memory (ROM) 2 via a ROM data bus c. The ROM 2 stores in advance a series of programs essentially composed of instructions straand data. The CPU 100 outputs an address signal a and an access signal b to the ROM 2. On receipt of the access signal b, the ROM 2 outputs a program stored at an address corresponding to the address signal a to the CPU 100 via the ROM data bus c.

Processing of an instruction performed inside the CPU 100 includes an instruction fetch cycle, an instruction decode cycle, and an execution cycle for performing execution of the instruction and the like. In the instruction fetch cycle, a program to be executed is acquired from the ROM 2. In the subsequent cycles including the instruction decode cycle, the acquired program is decoded and then subjected to actual processing such as memory access and data manipulation according to the decoded contents of the program.

The operation of the ROM 2 in the instruction fetch cycle will be described with reference to FIGS. 12 and 13.

FIG. 12 illustrates an internal configuration of the ROM 2, and FIG. 13 is a signal waveform diagram. As shown in FIG. 13, the instruction fetch cycle includes a precharge period T1 and a data determination period T2. In the precharge period the potentials at bit lines c1, c2, c3, and c4 of the ROM 2 shown in FIG. 12 are turned to a high (H) level on receipt of the access signal b such as a precharge signal. In the next data determination period T2, one signal line a1, a2, or a3 corresponding to the address signal a is selected by an address decoder 201. By this selection, N-ch transistors 200 connected to the selected signal line and also grounded are turned ON. Those among the bit lines c1, c2, c3, and c4 connected to the turned-ON transistors are then discharged with the potential thereof turned to a low (L) level, while the remaining bit lines hold the H potential. A program composed of a combination of the L and H potentials at the bit lines c1, c2, c3, and c4 is read via the ROM data bus c to the CPU 100.

Thereafter, on receipt of an instruction data determination signal (not shown), the read program is stored in an instruction register (not shown) of the CPU 100. Thus, the instruction fetch cycle is terminated.

In the conventional computer device described above, access to the ROM 2 is only once in the instruction fetch cycle. This arises the following problem. In general, each memory cell of the ROM 2 is essentially constructed of one capacitor and one transistor. With this configuration, if a bit line that is not connected to a turned-ON N-ch transistor 200 is grounded due to noise or the like while it holds the precharged potential and resultantly the H data is turned to L data, there is provided no means for correcting this error. As a result, a program may be read mistakenly from the CPU 100, and the mistakenly read program may be decoded and executed by the ROM 2.

SUMMARY OF THE INVENTION

An object of the present invention is providing a computer device capable of detecting an error when a program is mistakenly read from a ROM and reading the program again correctly to ensure safe operation.

To attain the above object, according to the present invention, a same program is read a plurality of times, and matching/non-matching of the read programs is detected. Only when matching is detected, the program is executed.

Specifically, the computer device of the present invention includes: a CPU for outputting an address signal and also outputting an access signal twice for the same address signal; a memory for storing a series of programs, the memory receiving the address signal and the access signal from the CPU and outputting a program located at an address corresponding to the address signal twice in response to the access signal; a latch circuit for latching the program output from the memory, according to the access signal; and a match detection circuit for comparing the two programs at the same address output from the memory, that is, a first-time program output from the latch circuit and a second-time program output from the memory, and detecting matching of the two programs, wherein the CPU receives a comparison result signal from the match detection circuit, and outputs the access signal for the same address again if the matching of the programs fails, so that the match detection circuit performs comparison of a third-time program output from the memory with the second-time program output from the latch circuit.

In the computer device described above, preferably, the first-time, second-time, and third-time programs are output from the memory in an instruction fetch cycle, and when the match detection circuit detects matching between the second-time program and the third-time program, the CPU proceeds to a decode cycle for the matching program.

Alternatively, the computer device of the present invention includes: a CPU for outputting an address signal and also outputting an access signal three times or more for the same address signal; a memory for storing a series of programs and outputting a program located at an address corresponding to the address signal sequentially in response to the access signal output three times or more; a plurality of latch circuits connected in series for latching the program output from the memory sequentially in response to the access signal output three times or more; and a match detection circuit for comparing the plurality of programs at the same address output from the memory, that is, a program output last from the memory and programs output from the respective latch circuits, and detecting matching of all the programs, wherein when the match detection circuit detects matching of all the programs, the CPU proceeds to a decode cycle for the matching program.

In the computer device described above, preferably, a majority circuit for determining a program based on majority rule among the plurality of programs at the same address output from the memory is provided in place of the plurality of latch circuits and the match detection circuit, and the CPU decodes the program determined as the majority by the majority circuit.

Alternatively, the computer device of the present invention includes: a memory for storing a series of programs; and a CPU for sequentially fetching programs from the memory in a pipeline, and decoding and executing the programs, wherein the CPU fetches a first program from the memory in a fetch cycle, in a decode cycle for the first program, the CPU fetches a second program succeeding to the first program, and also requests the memory to re-read the first program, compares the re-read first program with the first program fetched in the fetch cycle for the first program, and proceeds to execution of the first program if the two programs match with each other.

In the computer device described above, preferably, if the two programs fail to match with each other, the CPU requests the memory to second re-read the first program, compares the second re-read first program with the re-read first program, and proceeds to execution of the first program if the two programs match with each other.

In the computer device described above, preferably, the memory receives an address signal from the CPU, and outputs a program located at an address corresponding to the address signal and a program at an address immediately preceding the address corresponding to the address signal.

In the computer device described above, preferably, the memory stores a series of programs in rows and columns in the address order, and on receipt of the address signal from the CPU, the memory outputs two continuous row selection signals and two continuous column selection signals.

The computer device described above preferably further includes a latch circuit, wherein the latch circuit latches the first program output from the memory in the fetch cycle in synchronization with the access signal output from the CPU, and a match detection circuit is connected to the CPU for detecting matching between the first program latched by the latch circuit and the first program re-read in the decode cycle.

In the computer device described above, preferably, when the first program is re-read in the decode cycle, the latch circuit latches the re-read first program, and the match detection circuit detects matching between the secondly re-read first program read when the two first programs fail to match with each other and the re-read first program latched by the latch circuit.

Thus, according to the present invention, a program stored at a given address of the ROM is read a plurality of times, and the program is decoded and executed only when the match detection circuit detects matching of the read programs. This enables safe operation of the CPU as intended according to the correctly read program.

In particular, according to the present invention, when first-time and second-time programs read successively from the same address fail to match with each other, a third-time program is read from the same address. Only when the third-time program matches with the second-time program, the program is decoded and executed. Therefore, even when a program is mistakenly read once, a correctly read program can be executed only by reading the program at the same address three times in total.

According to the present invention, in the decode cycle, while a program fetched in the preceding instruction fetch cycle is being decoded, the program is re-fetched. Only when the re-fetched program matches with the program fetched in the preceding instruction fetch cycle, execution of the decoded program is allowed. Thus, since correct read of the program is confirmed simultaneously with decoding of the program, a high processing speed can be maintained.

Moreover, according to the present invention, a read program is latched by the latch circuit. The program latched by the latch circuit is always the latest-read program. Accordingly, even when the first read program is mistaken due to noise or the like, for example, a correctly read program can be latched by the latch circuit, and this enables confirmation of correct read of a program with high probability.

DESCRIPTION OF THE PREFERRED EMBODIMENTS

Hereinafter, preferred embodiments of the present invention will be described with reference to the accompanying drawings.

(First Embodiment)

Figure 1:
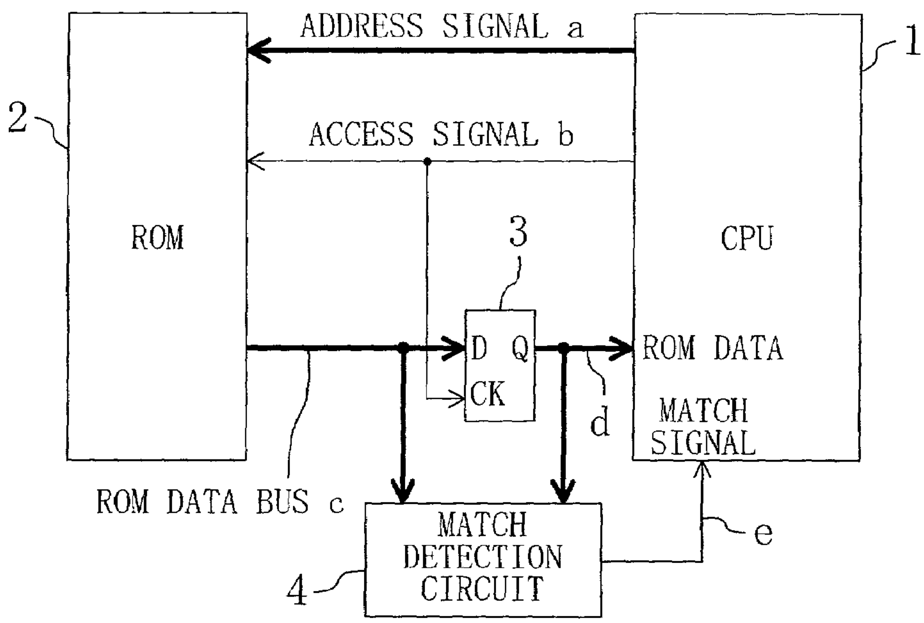
FIG. 1 is a block diagram of a computer device of a first embodiment of the present invention.
Figure 2:
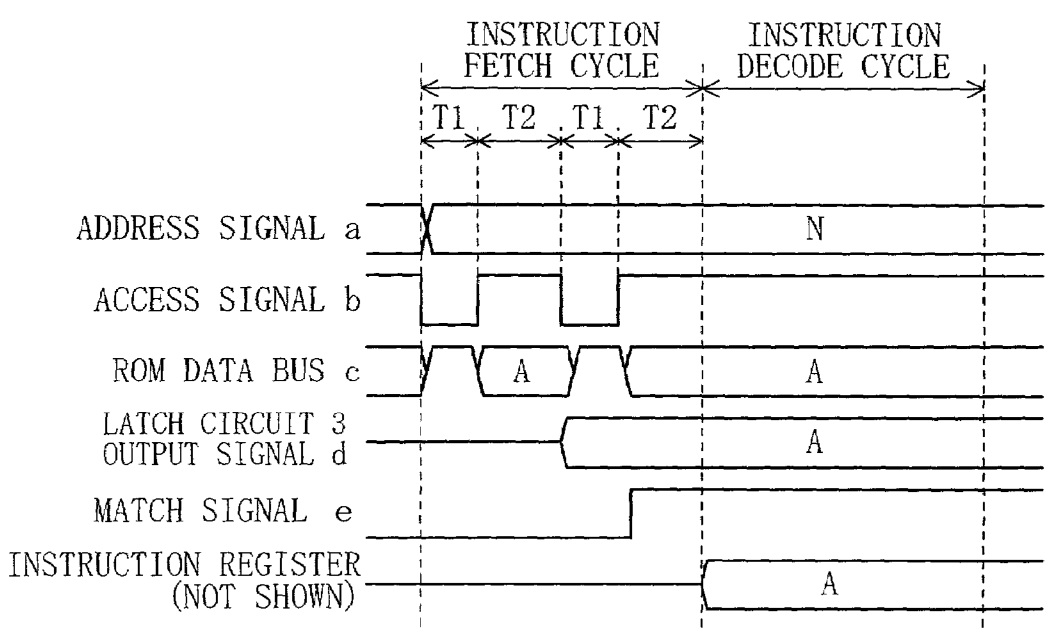
FIG. 2 is a signal waveform diagram of the computer device of the first embodiment.
Figure 3:
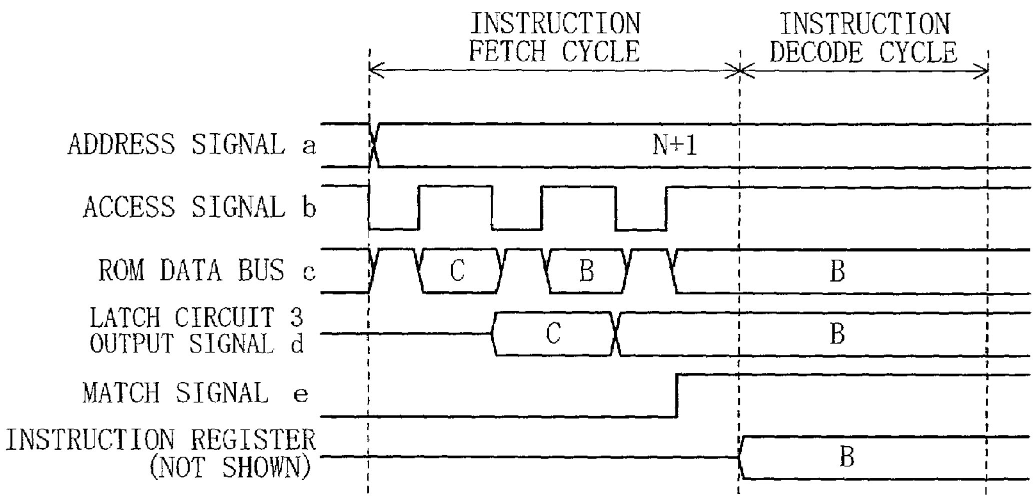
FIG. 3 is also a signal waveform diagram of the computer device of the first embodiment.

FIG. 1 illustrates the entire configuration of a computer device of the first embodiment of the present invention. FIGS. 2 and 3 illustrate the operation of the computer device of this embodiment. Referring to FIG. 1, a CPU 1 and a ROM (memory) 2 are connected to each other via a ROM data bus c. A latch circuit 3 is provided on the ROM data bus c. The CPU 1 outputs an address signal a and an access signal b such as a precharge signal to the ROM 2. The access signal b is output twice for the same address signal a. The ROM 2 outputs a program stored at an address corresponding to the address signal a onto the ROM data bus c every time it receives the access signal b. The latch circuit 3 also receives the access signal b as a clock signal. The latch circuit 3 latches the program output onto the ROM data bus c from the ROM 2 upon receipt of the access signal b, and outputs the latched program to the CPU 1 upon receipt of the next access signal b. A match detection circuit 4 receives the program output onto the ROM data bus c from the ROM 2 and the program output from the latch circuit 3 (output signal d), and detects whether or not the two programs match with each other. If they match, the match detection circuit 4 outputs a match signal (comparison result signal) e to the CPU 1.

The operation of the computer device of this embodiment will be described with reference to the signal waveform diagrams of FIGS. 2 and 3. Assume that address data N and N+1 are sequentially output from the CPU 1 as the address signal a, and the programs corresponding to the address data N and N+1 are A and B, respectively.

First, referring to FIG. 2, the case that a program is correctly read from the ROM 2 will be described. In the instruction fetch cycle, the CPU 1 outputs the address data N as the address signal a and the access signal b to the ROM 2. Upon receipt of the access signal b, the ROM 2 outputs the program A corresponding to the address data N. In the same instruction fetch cycle, the CPU 1 outputs the access signal b again. On receipt of this access signal b, the latch circuit 3 outputs the latched program A, while the ROM 2 outputs the program A again. The match detection circuit 4 compares the program A output onto the ROM data bus c from the ROM 2 with the contents (program A) of the output signal d from the latch circuit 3. Since the two programs match with each other in this case, the match detection circuit 4 outputs the match signal e to the CPU 1. On receipt of the match signal e, the CPU 1 stores the contents (program A) of the output signal d from the latch circuit 3 in the internal instruction register as ROM data. Thus, the instruction fetch cycle is terminated. Thereafter, the program A is decoded in the instruction decode cycle.

Next, referring to FIG. 3, the case that a program is mistakenly read from the ROM 2 will be described. In the instruction fetch cycle, when the CPU 1 outputs the address data N+1 as the address signal a to the ROM 2, the ROM 2 mistakenly outputs a program C, in place of the correct program B, due to noise, upon receipt of the access signal b. The CPU 1 outputs the address signal a (address data N+1) and the access signal b again in the same instruction fetch cycle. Upon receipt of this access signal b, the latch circuit 3 latches and outputs the latched program C, and the ROM 2 outputs the correct program B this time. Since the two programs do not match with each other, the match detection circuit 4 does not output the match signal e, and therefore the CPU 1 does not recognize the output signal d (program C) from the latch circuit 3 as the ROM data. In this case, the CPU 1 extends the instruction fetch cycle, and outputs the access signal b to the ROM 2 a third time. This time, the output signal d from the latch circuit 3 represents the program B, and the ROM 2 correctly outputs the program B. As a result, the match detection circuit 4 outputs the match signal e, and the CPU 1 correctly stores the program B in the instruction register as the ROM data. Thus, the instruction fetch cycle is terminated. Thereafter, the program B is decoded in the instruction decode cycle.

As is understood from the above description, in the computer device of this embodiment, the access signal b is output a plurality of times for the same contents of the address signal a in the same instruction fetch cycle, so that the match detection circuit 4 detects matching between a program currently read from the ROM 2 every time the access signal b is output and a program read immediately before the currently read program. If the matching fails, the instruction fetch cycle is extended to read the program once more. And only after the matching of the programs read at the same address is confirmed, the process proceeds to the next decode cycle. This prevents the CPU 1 from executing a wrong program, and thus a safely operable computer device is provided.

Even when the program C is mistakenly read at the first read, the correct program B read at the second read is latched and output by the latch circuit 3 at the third read. Therefore, at the third read, the match detection circuit 4 compares the program B read at the second read with the program B read at the third read, to confirm the matching. Thus, even when the first read is wrong, the CPU 1 can proceed to the next decode cycle by a total of three read operations.

(First Modification)

Figure 4:
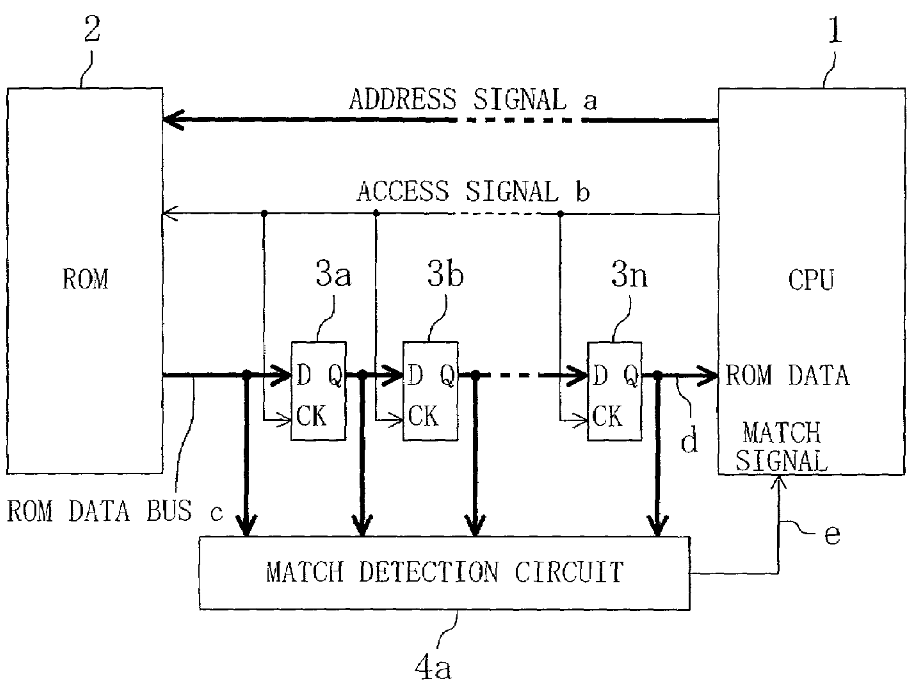
FIG. 4 is a block diagram of a computer device of a first modification of the first embodiment of the present invention.

FIG. 4 illustrates the first modification of the first embodiment described above. In this modification, a plurality of latch circuits 3*a*, 3*b*, . . . , 3*n* are provided, and the access signal b is output from the CPU 1 by the number of times equal to the number of latch circuits (n times). A match detection circuit 4*a* detects matching among a total of n+l programs at the same address output from the latch circuits 3*a*, 3*b*, . . . , 3*n* and the ROM 2.

In this modification, therefore, the reliability of the ROM data input into the CPU 1 is further improved.

(Second Modification)

Figure 5:
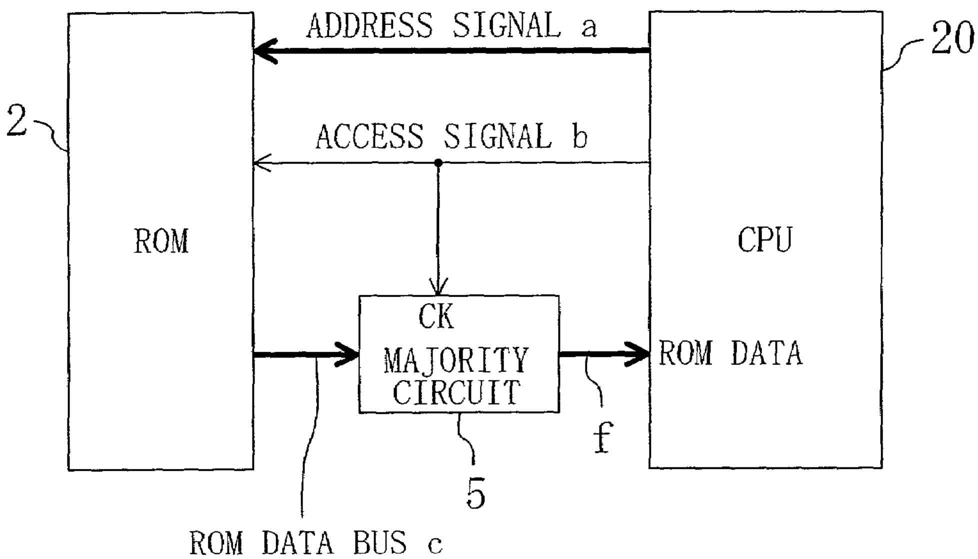
FIG. 5 is a block diagram of a computer device of a second modification of the first embodiment of the present invention.

FIG. 5 illustrates the second modification of the first embodiment. In this modification, the same components as those in FIG. 1 are denoted by the same reference numerals, and the description thereof is omitted. Only components different from those in FIG. 1 are described hereinafter.

Referring to FIG. 5, a CPU 20 outputs the access signal b a plurality of times (for example, 3 times or 5 times) in the same instruction fetch cycle. A majority circuit 5 samples values (programs) on the ROM data bus c read from the ROM 2 in the same cycle as that of the access signal b, determines a program based on majority rule among these programs, and outputs the resultant majority program to the CPU 20.

Figure 6:
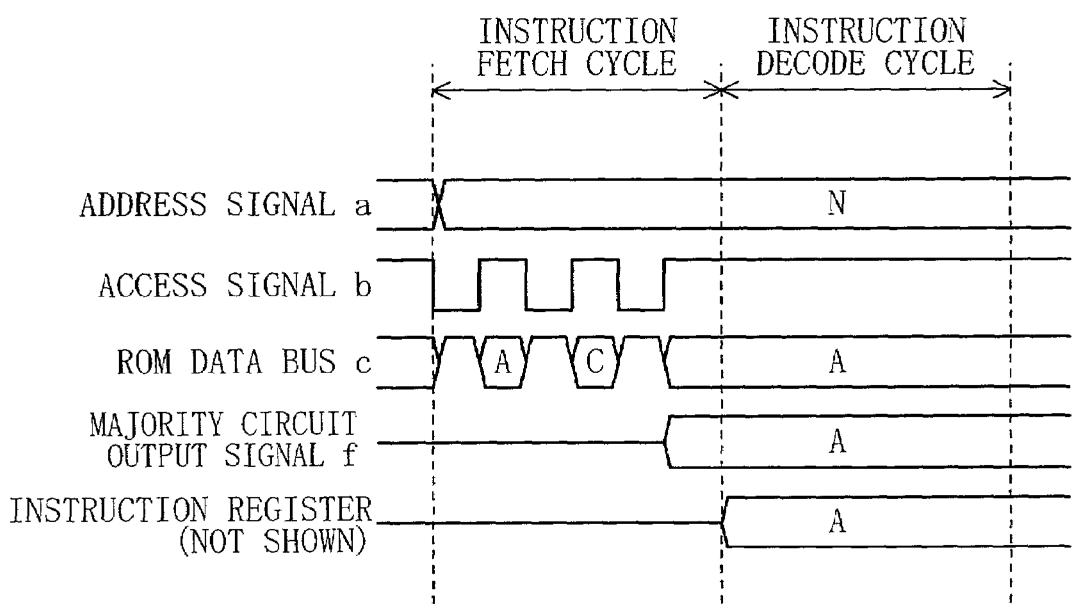
FIG. 6 is a signal waveform diagram of the computer device of the second modification of the first embodiment.

Specifically, referring to the signal waveform diagram of this modification shown in FIG. 6, the CPU 20 outputs ad-dress data N as the address signal a and also outputs the access signal b a plurality of times in the instruction fetch cycle. Upon receipt of these signals, the ROM 2 outputs a program A at an address corresponding to the address data N a plurality of times. The read programs are input into the majority circuit 5. The majority circuit 5 determines a program based on majority rule among these programs and outputs the resultant majority program to the CPU 20 as ROM data. Therefore, even when a wrong program C is temporarily read from the ROM 2 due to influence of noise or the like, it is ensured that the correct program A is input into the CPU 20, to be processed in the next instruction decode cycle and the subsequent cycle. This enables correct operation without the necessity of changing the execution time required for processing of one instruction.

(Second Embodiment)

A computer device of the second embodiment of the present invention will be described.

Figure 7:
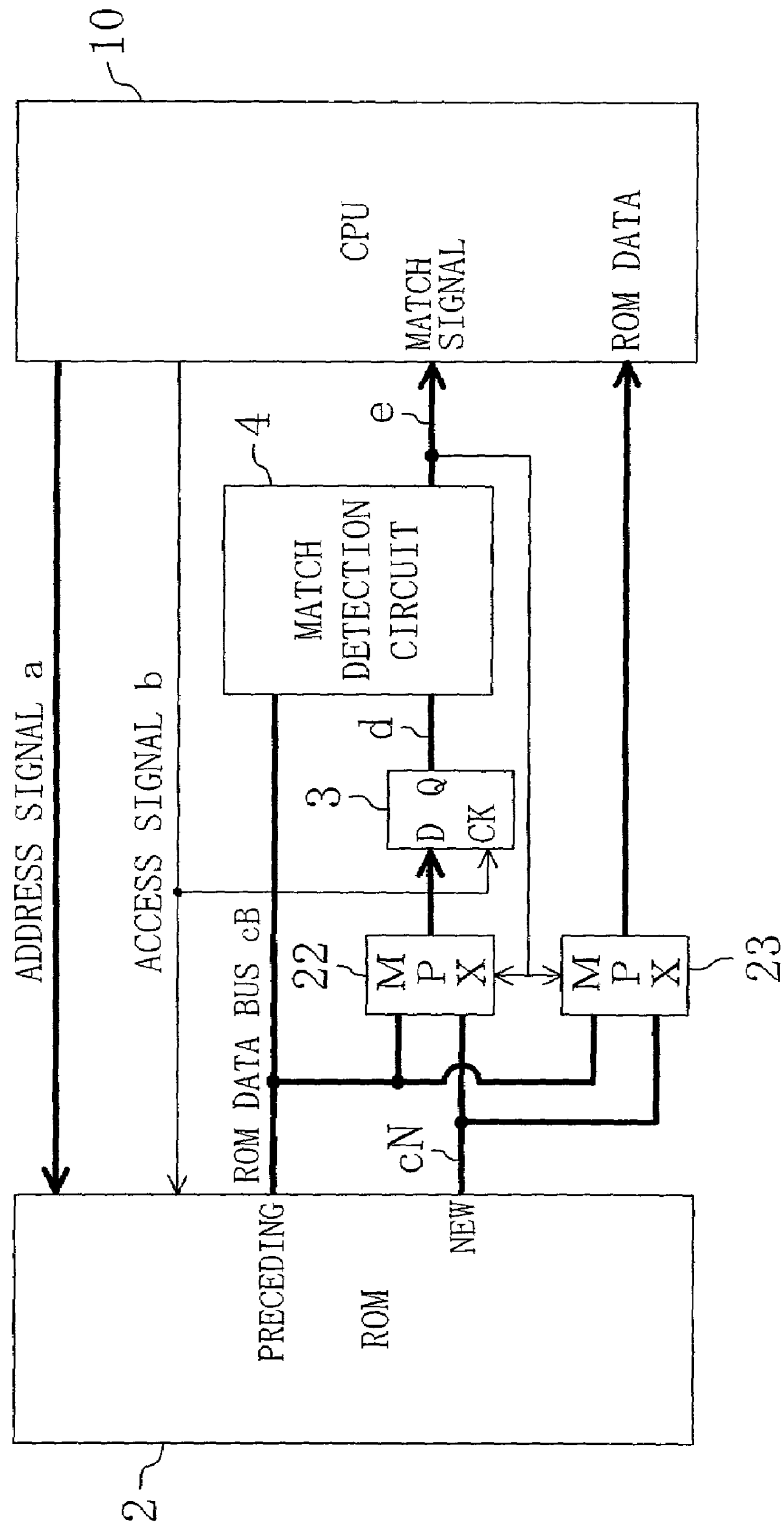
FIG. 7 is a block diagram of a computer device of a second embodiment of the present invention.

FIG. 7 illustrates a configuration of the computer device of this embodiment. A CPU 10 outputs an access signal b to a ROM 2. The access signal b is output once together with an address signal a in the instruction fetch cycle, and further output once more in the next instruction decode cycle for the same address data of the address signal a.

Figure 10:
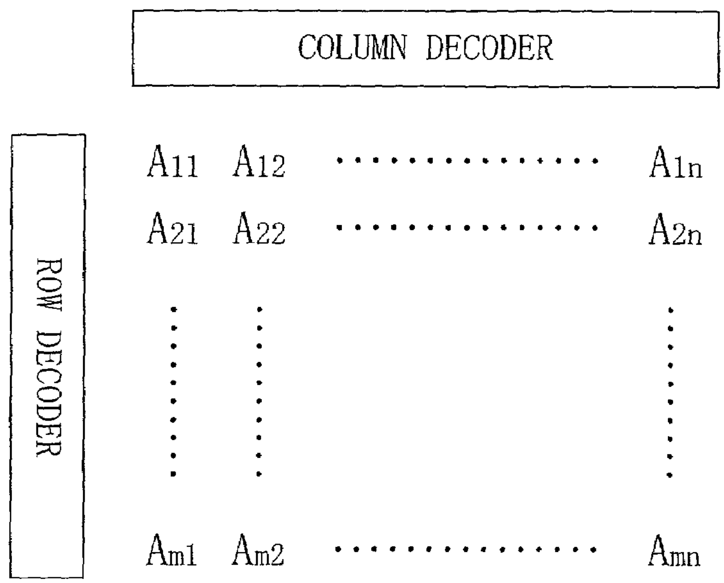
FIG. 10 is a schematic illustration of a memory of the computer device of the second embodiment.
Figure 11:
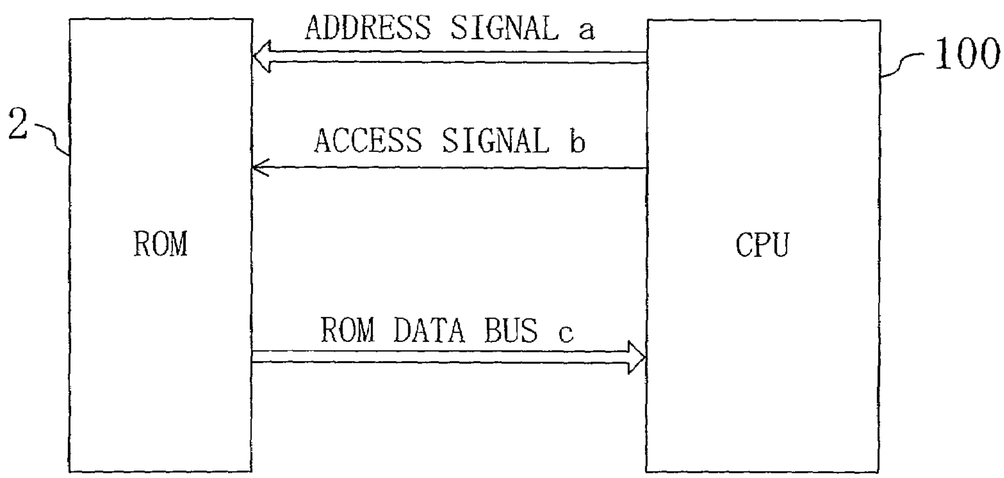
FIG. 11 is a block diagram of a conventional computer device.
Figure 12:
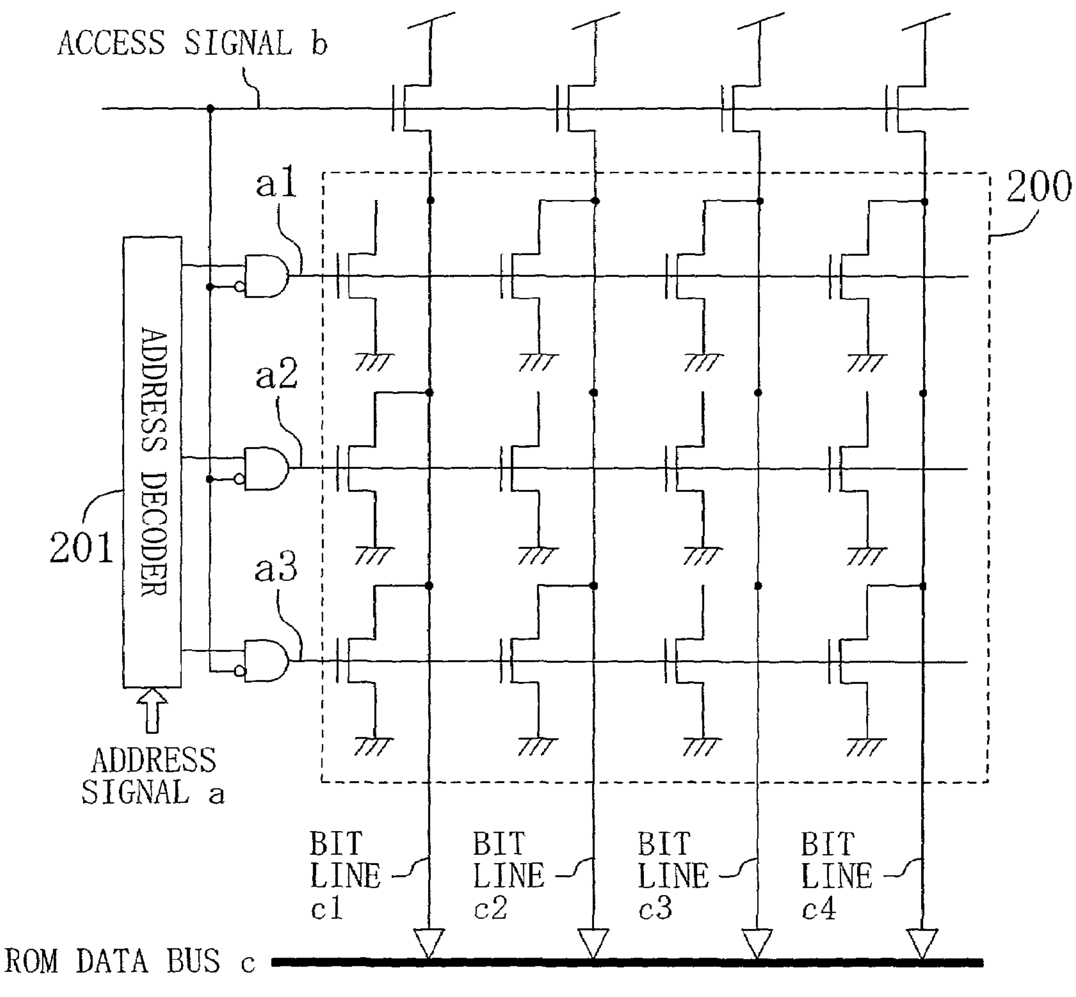
FIG. 12 is a block diagram of a ROM of the conventional computer device.
Figure 13:
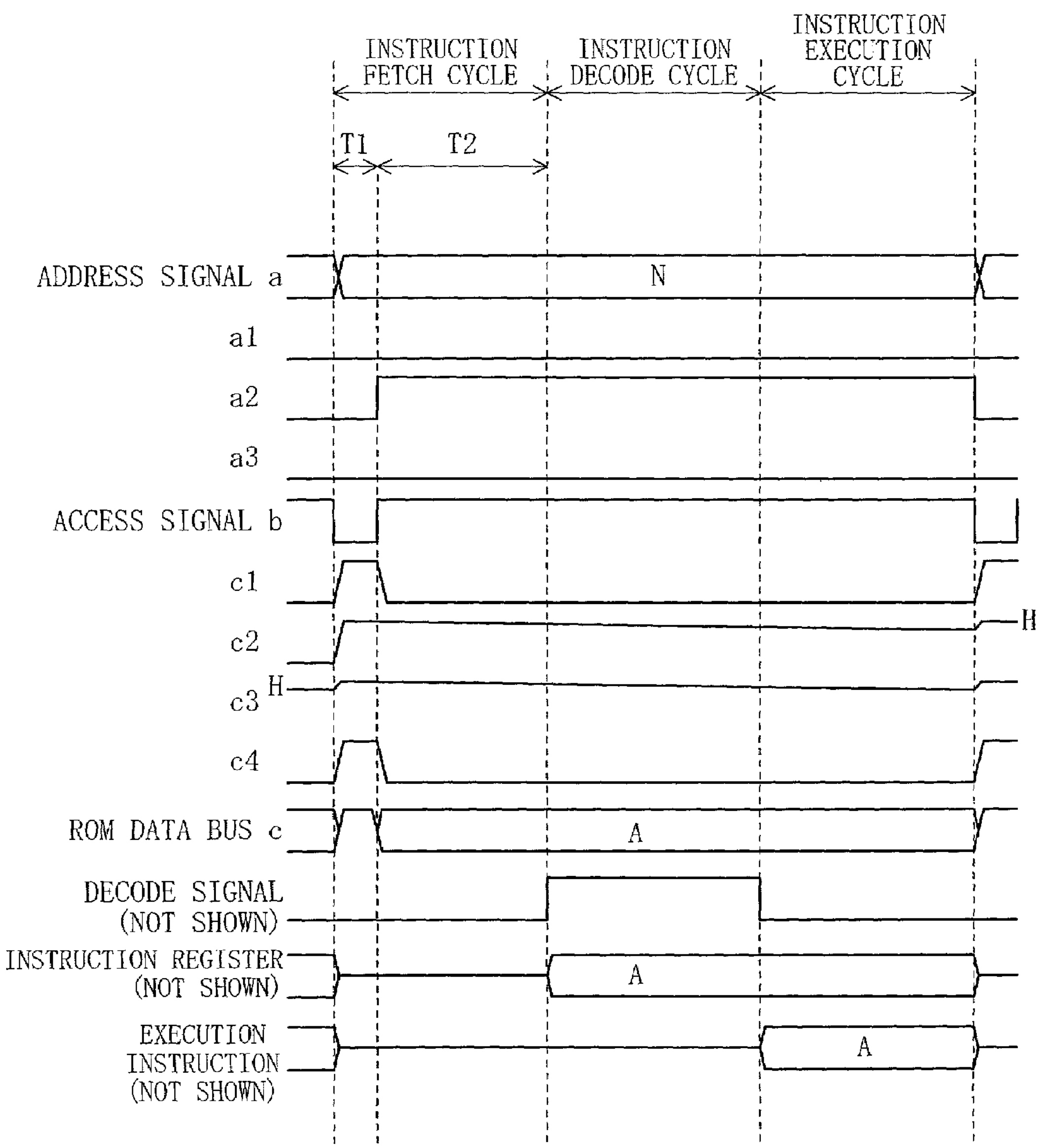
FIG. 13 is a signal waveform diagram of the conventional computer device.

The ROM 2 has a configuration as shown in FIG. 10, where a series of programs A11, A12 . . . A1n, A21 . . . Am1 . . . Amm are stored in rows and columns in the address order. Upon receipt of the address signal a from the CPU 10, the ROM 2 outputs one row selection signal and one column selection signal so that an address corresponding to the address signal a is selected, and also outputs another row selection signal and another column selection signal so that an address immediately preceding the address corresponding to the address signal a is selected. That is, upon receipt of the address signal a from the CPU 10, the ROM 2 outputs a program corresponding to the address signal a (hereinafter, this program is referred to as a new program) onto a ROM data bus cN, and also outputs a program corresponding to the address immediately preceding the address corresponding to the address signal a (hereinafter, this program is referred to as a preceding program) onto a ROM data bus cB. When these two programs are located in the same row or the same column, the two row selection signals or the two column selection signals are the same.

Referring to FIG. 7, each of first and second multiplexers 22 and 23 receives the preceding program and the new program, and selects one from these programs. The program selected by the second multiplexer 23 is input into the CPU 10 as ROM data. A latch circuit 3 receives the access signal b from the CPU 10 as a clock signal, and also latches the program selected by the first multiplexer 22. A match detection circuit 4 detects whether or not the program output from the latch circuit 3 and the preceding program output from the ROM 2 match with each other, and outputs a match signal e to the CPU 10 when they match with each other. The match signal e is also supplied to the first and second multiplexers 22 and 23. The first and second multiplexers 22 and 23 normally select the new program from the ROM 2, and select the preceding program from the ROM 2 when they do not receive the match signal e, that is, when the programs do not match with each other.

Figure 8:
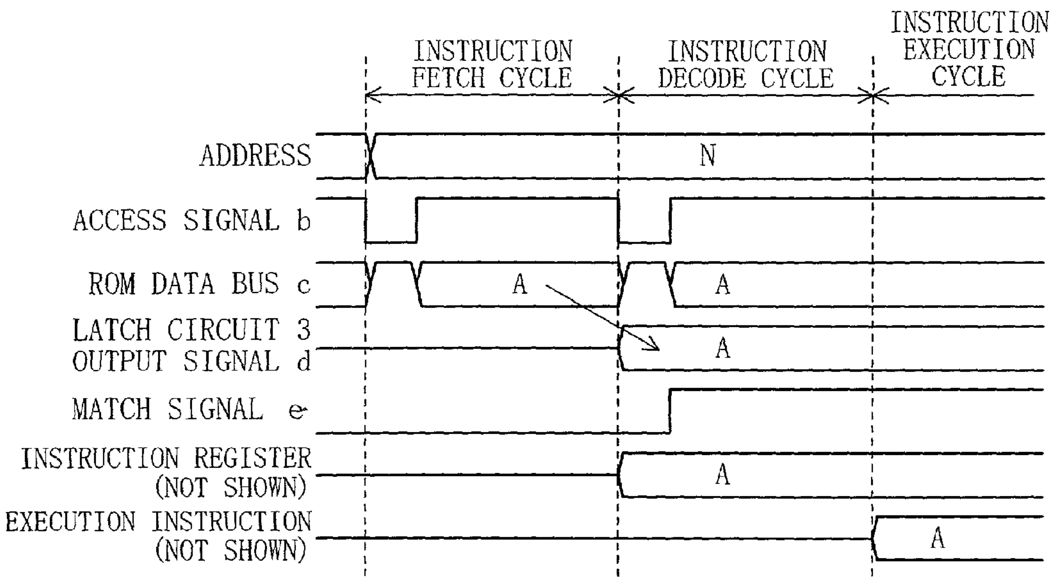
FIG. 8 is a signal waveform diagram of the computer device of the second embodiment.
Figure 9:
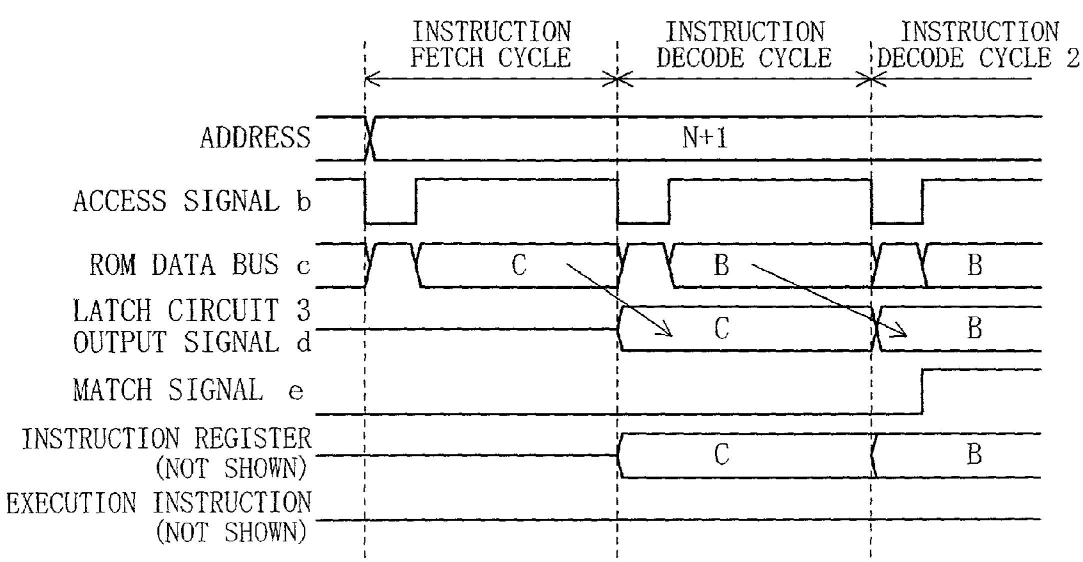
FIG. 9 is also a signal waveform diagram of the computer device of the second embodiment.

The operation of the computer device of this embodiment shown in of FIG. 7 will be described with reference to the signal waveform diagrams of FIGS. 8 and 9. Note that as in the first embodiment, address data N and N+1 are sequentially output from the CPU 10 as the address signal a, and the programs corresponding to the address data N and N+1 are A and B, respectively.

First, referring to FIG. 8, the case that address data N is output as the address signal a and a program is correctly read from the ROM 2 will be described. In the instruction fetch cycle, the CPU 10 outputs the address signal a (address data N) and the access signal b to the ROM 2. On receipt of these signals, the ROM 2 outputs a new program A. The first multiplexer 22 selects the new program A, which is then latched by the latch circuit 3. The second multiplexer 23 also selects the new program A, which is then input into the CPU 10 as the ROM data. Thus, the instruction fetch cycle is terminated.

Thereafter, the CPU 10 shifts the internal state to the instruction decode cycle, where the CPU 10 decodes the input new program A and prepares for processing corresponding to the program A. Simultaneously, the CPU 10 outputs the next address signal a (address data n+1) and the access signal b to the ROM 2. The ROM 2 outputs the preceding program A corresponding to the address N immediately preceding the current address of the address signal a. The latch circuit 3 outputs the latched program A. The match detection circuit 4 compares the two programs A and outputs the match signal e to the CPU 10. The second multiplexer 23 selects the preceding program A on receipt of the match signal e and outputs it to the CPU 10. The CPU 10, which has received the match signal e, stores the program A input from the second multiplexer 23 in an instruction register thereof as the correctly read ROM data. Thus, the instruction decode cycle is terminated.

Next, referring to FIG. 9, the case that address data N+1 is output as the address signal a and a program C is mistakenly read from the ROM 2 in place of the program B due to noise will be described. In the instruction fetch cycle, the address signal a (address data N+1) and the access signal b are input into the ROM 2. The ROM 2 mistakenly outputs a program C in place of the program B, and the program C is selected by the first multiplexer 22 and latched by the latch circuit 3. The program C is also selected by the second multiplexer 23 and input into the CPU 10. Thus, the instruction fetch cycle is terminated.

Thereafter, the CPU 10 shifts the internal state to the instruction decode cycle, where the CPU 10 decodes the input program C and prepares for processing corresponding to the program C. Simultaneously, however, the CPU 10 outputs the access signal b to the ROM 2, and in response, the ROM 2 outputs again the preceding program B onto the ROM data bus cB.

The match detection circuit 4 compares the re-read program B with the program C output from the latch circuit 3, and as a result, does not output the match signal e. The CPU 10, which receives no match signal e, halts the decoding performed for the program C. The first multiplexer 22 then selects the ROM data bus cB, and thus the latch circuit 3 latches the re-read program B present on the ROM data bus cB. The second multiplexer 23 also selects the re-read program B present on the ROM data bus cB, which is then input into the CPU 10.

Subsequently, the CPU 10, which has halted the decoding for the program C, outputs the access signal b again for re execution of the instruction decode cycle. In this second-time instruction decode cycle, the latch circuit 3 outputs the re-read program B, and the ROM 2 outputs the preceding program B a third time onto the ROM data bus cB. Since the two programs match with each other, the match detection circuit 4 outputs the match signal e to the CPU 10. The CPU 10, which has received the match signal e, stores the program B input from the second multiplexer 23 in the instruction register thereof as the correctly read ROM data. Thus, the instruction decode cycle is terminated, and the process proceeds to the instruction execution cycle for performing actual processing such as memory access and data manipulation.

As is understood from the above description, the computer device of this embodiment outputs the access signal b again in the instruction decode cycle after termination of the instruction fetch cycle. In the instruction decode cycle, the match detection circuit 4 determines whether or not the program under decoding is a correctly read program. If it is found that the program has been mistakenly read, the program at the same address is read again, and thereafter decoding is performed. This prevents a mistakenly read program from being executed.

In addition, in this embodiment, whether or not a program has been correctly read is determined in the instruction decode cycle. Therefore, the time period of one cycle can be shortened compared with the case in the first embodiment in which a program at the same address is read a plurality of times sequentially in the instruction fetch cycle. This makes it possible to provide a safely operable computer device with an increased processing speed.

When the program read from the ROM 2 is a branch instruction, the new program read from the ROM 2 in the instruction fetch cycle and the preceding program read for comparison in the next instruction decode cycle always fail to match with each other. In this case, therefore, read of the preceding program in the instruction decode cycle is forcefully halted.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A computer device comprising:

a CPU for outputting an address signal and also outputting an access signal twice for the same address signal;

a memory for storing a series of programs, the memory receiving the address signal and the access signal from the CPU and outputting a program located at an address corresponding to the address signal twice in response to the access signal;

a latch circuit for latching the program output from the memory, according to the access signal; and a match detection circuit for comparing the two programs at the same address output from the memory, that is, a first-time program output from the latch circuit and a second-time program output from the memory, and detecting matching of the two programs, wherein the CPU receives a comparison result signal from the match detection circuit, and outputs the access signal for the same address again if the matching of the programs fails, so that the match detection circuit performs comparison of a third-time program output from the memory with the second-time program output from the latch circuit.

2. The computer device of claim 1, wherein the first-time, second-time, and third-time programs are output from the memory in an instruction fetch cycle, and when the match detection circuit detects matching between the second-time program and the third-time program, the CPU proceeds to a decode cycle for the matching program.

3. A computer device comprising:

a CPU for outputting an address signal and also outputting an access signal three times or more for the same address signal;

a memory for storing a series of programs and outputting a program located at an address corresponding to the address signal sequentially in response to the access signal output three times or more;

a plurality of latch circuits connected in series for latching the program output from the memory sequentially in response to the access signal output three times or more; and a match detection circuit for comparing the plurality of programs at the same address output from the memory, that is, a program output last from the memory and programs output from the respective latch circuits, and detecting matching of all the programs, wherein when the match detection circuit detects matching of all the programs, the CPU proceeds to a decode cycle for the matching program.

4. The computer device of claim 3, wherein a majority circuit for determining a program based on majority rule among the plurality of programs at the same address output from the memory is provided in place of the plurality of latch circuits and the match detection circuit, and the CPU decodes the program determined as the majority by the majority circuit.

5. A computer device comprising:

a memory for storing a series of programs, the memory receiving an address signal from the CPU and outputting a program located at an address corresponding to the address signal and a program located at an address immediately preceding the address corresponding to the address signal in the same fetch cycle; and a CPU for sequentially fetching programs from the memory in a pipeline, and decoding and executing the programs, wherein the CPU fetches a first program from the memory in a fetch cycle, in a decode cycle for the first program, the CPU fetches a second program succeeding to the first program, and also requests the memory to re-read the first program, compares the re-read first program with the first program fetched in the fetch cycle for the first program, and proceeds to execution of the first program if the two programs match with each other.

6. The computer device of claim 5, wherein if the two programs fail to match with each other, the CPU requests the memory to second re-read the first program, compares the second re-read first program with the re-read first program, and proceeds to execution of the first program if the two programs match with each other.

7. The computer device of claim 6, further comprising a latch circuit, wherein the latch circuit latches the first program output from the memory in the fetch cycle in synchronization with the access signal output from the CPU, and a match detection circuit is connected to the CPU for detecting matching between the first program latched by the latch circuit and the first program re-read in the decode cycle.

8. The computer device of claim 7, wherein when the first program is re-read in the decode cycle, the latch circuit latches the re-read first program, and the match detection circuit detects matching between the second re-read first program read when the two first programs fail to match with each other and the re-read first program latched by the latch circuit.

9. The computer device of claim 5, wherein the memory stores a series of programs in rows and columns in the address order, and on receipt of the address signal from the CPU, the memory outputs two continuous row selection signals and two continuous column selection signals.

* * * * *